United States Patent [19]

Texter

[11] Patent Number: 5,274,109

[45] Date of Patent: Dec. 28, 1993

[54] MICROPRECIPITATED METHINE OXONOL FILTER DYE DISPERSIONS

[75] Inventor: John Texter, Rochester, N.Y.

[73] Assignee: Eastman Kodak Company, Rochester, N.Y.

[21] Appl. No.: 812,519

[22] Filed: Dec. 20, 1991

[51] Int. Cl.$^5$ .................. C07D 231/20; C07D 231/22; C07D 231/26
[52] U.S. Cl. ..................... 548/365.4; 430/522
[58] Field of Search ....................... 548/365.4

[56] References Cited

U.S. PATENT DOCUMENTS

| | | | |
|---|---|---|---|
| 3,865,817 | 2/1975 | Kobayushi et al. | 260/240.2 |
| 3,933,798 | 1/1976 | Curtis et al. | 260/239.9 |
| 4,092,168 | 5/1978 | Lemahieu et al. | 96/84 R |
| 4,179,294 | 12/1979 | Sugiyama et al. | 430/522 A |
| 4,266,014 | 5/1981 | Moelants et al. | 430/522 |
| 4,288,534 | 9/1981 | Lemahieu et al. | 430/522 |
| 4,440,852 | 4/1984 | Onishi et al. | 430/522 |
| 4,770,984 | 9/1988 | Ailliet et al. | 430/505 |
| 4,833,246 | 5/1989 | Adachi et al. | 544/82 |
| 4,855,221 | 8/1989 | Factor et al. | 430/510 |
| 4,877,721 | 10/1989 | Diehl et al. | 430/522 |
| 4,895,786 | 1/1990 | Kurematsu et al. | 430/139 |
| 4,904,565 | 2/1990 | Schmidt et al. | 430/513 |
| 4,933,268 | 6/1990 | Ohno et al. | 430/518 |
| 4,933,270 | 6/1990 | Bagchi | 430/557 |
| 4,940,654 | 7/1990 | Diehl et al. | 430/522 |

FOREIGN PATENT DOCUMENTS

| | | |
|---|---|---|
| 246553 | 11/1987 | European Pat. Off. |
| 351593 | 1/1990 | European Pat. Off. |
| 218641 | 11/1985 | Japan |
| 3139949 | 6/1988 | Japan |
| 1177429 | 1/1970 | United Kingdom |
| 1570362 | 7/1980 | United Kingdom |

*Primary Examiner*—Richard L. Raymond
*Attorney, Agent, or Firm*—Robert A. Gerlach

[57] ABSTRACT

A microprecipitated dispersion comprising a methine oxonol filter dye is provided which has the formula

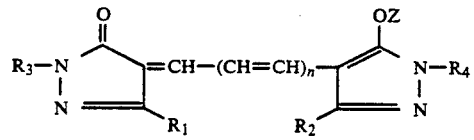

wherein n is 0, 1, or 2; $R_1$, $R_2$, $R_3$, and $R_4$ are the same or different substituted or unsubstituted alkyl or aryl groups, one or more of $R_1$, $R_2$, $R_3$, and $R_4$ contains carboxy substituent $-CO_2Z$, wherein $Z^+$ is a statistical mixture of hydrogen ($H^+$) and alkali or tetraalkylammonium cations ($M^+$) such that $Z^+ = xH^+ + (1-x)M^+$, where x is a decimal ranging from about 0.33 to about 0.95, and photographic elements containing them.

16 Claims, 3 Drawing Sheets

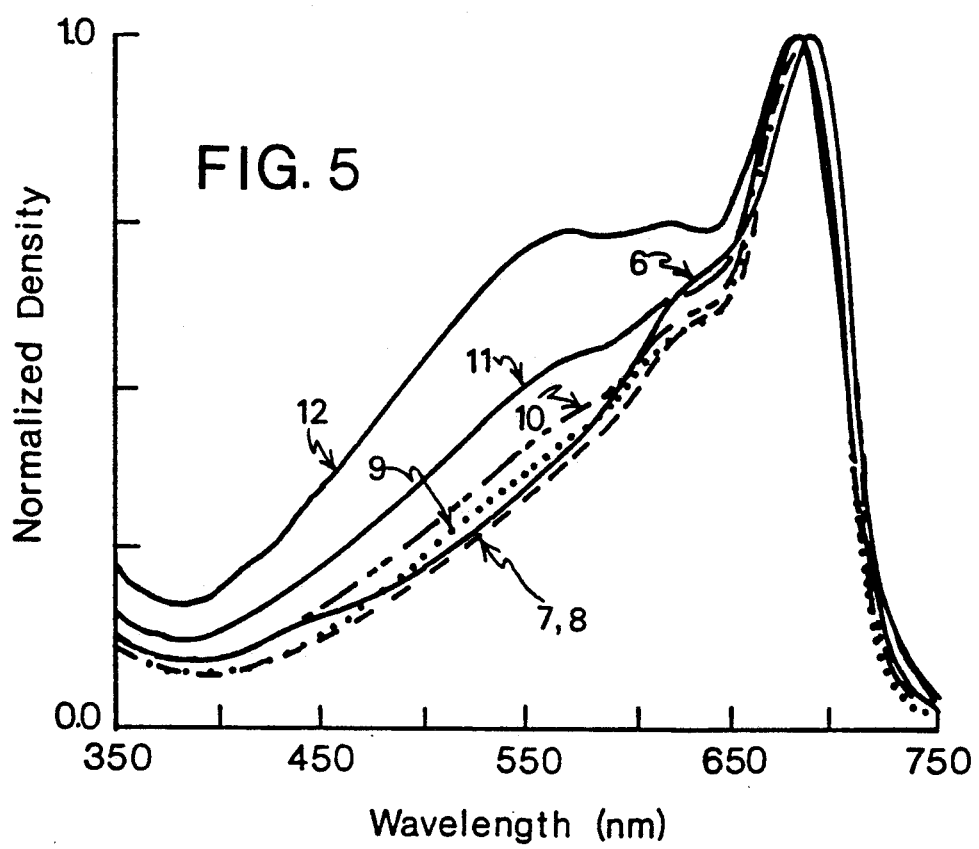

MICROPRECIPITATED METHINE OXONOL FILTER DYE DISPERSIONS

CROSS-REFERENCE TO RELATED APPLICATION

This application relates to commonly assigned copending application Ser. No. 07/812,503, filed Dec. 20, 1991 and hereby incorporated herein by reference for all that it discloses.

TECHNICAL FIELD

This invention relates to microprecipitated dispersions of filter dyes which are particularly useful in photographic elements. More particularly, this invention relates to microprecipitated dispersions of mono-, tri-, and penta-methine oxonol filter dyes having particularly advantageous properties.

BACKGROUND ART

The use of filter dyes in photographic elements is well known. When incorporated in the radiation sensitive layer, filter dyes can improve sharpness by absorbing light scattered from one silver halide grain to another. Filter dyes can also be used in antihalation layers to retard the sensitivity of one light sensitive layer to another in a multilayer element by absorbing unwanted radiation due to reflection or refraction.

In these as well as the many other uses for filter dyes in photographic elements it is important that the dyes do not wander or diffuse into adjacent layers. This can cause problems such as speed loss or stain in the adjacent layers. Filter dyes must also be completely decolorized or removed from photographic elements, or both, usually during processing when their function is complete, or staining results. The latter problem is compounded when a polymeric mordant is used in the filter layer to prevent dye wandering.

Filter dye stability, particularly at high temperatures and humidity conditions is also important. It is often also highly desirable that the filter dye has a steep absorption peak; that is, that the dye is "sharp cutting".

One method used to incorporate soluble filter dyes into photographic film element layers is to add them as aqueous or alcohol solutions. Dyes introduced by this method often wander into other layers of the element, usually with deleterious effect. While the use of polymeric mordants can prevent dye wandering, such mordants aggravate the stain problem encountered when the dye remains in the element through processing.

Filter dyes have also been prepared as conventional dispersions in aqueous gelatin using standard colloid milling or homogenization methods or as loaded latexes. More recently, ball-milling, sand milling, media-milling, and related methods of producing fine particle size slurries and suspensions of filter dyes have become standard tools for producing slurries and dispersions that can readily be used in photographic melt formulations. Solid particulate filter dyes introduced as dispersions, when coated at sufficiently low pH, can eliminate problems associated with dye wandering. However, filter dye dispersions prepared by milling tend to have slow wash-out rates resulting in lengthy processing or unacceptable dye staining. Further, milled particulate filter dyes provide relatively low absorption coefficients, requiring that an excessive amount of dye be coated. Among other things, milled dyes can also provide too broad an absorption envelope for the contemplated use; the wavelength of maximum absorption may not be at optimal position in the visible region, or the long-wavelength absorption edge of the absorption band may not be optimally placed for the intended application.

In addition, the time and expense involved in preparing serviceable solid particulate filter dye dispersions by milling techniques are a deterrent to their use, especially in large volume applications.

It is also known that oxonol filter dyes can be prepared and purified in the fully protonated form by dissolution with a base followed by reprecipitation in *excess concentrated acid* as described in U.S. Pat. No. 4,855,221. Such macroscopic processes yield agglomerated particulates which are highly suitable for the bulk solid storage of the dyes but are not suitable for use as photographic filter dye dispersions. Extensive treatment by mechanical milling techniques using dispersing aids and stabilizers such as roller milling, sand milling, ball milling, and the like are required before such dyes can be used for photographic filter dye applications. Accordingly, agglomerates and slurries prepared by macroscopic precipitation processes are not suitable for use as photographic filter dyes and fall outside the scope of the definition of a colloid dispersion useful for such purposes.

It is therefore desirable to provide solid particulate filter dye microdispersions that do not require mechanical milling before use and that do not wander but that wash out easily during processing leaving little or no residual stain. It is also desirable that such filter dye dispersions provide high light absorption efficiencies with sharp-cutting absorbance peaks.

DISCLOSURE OF INVENTION

The invention provides microdispersions of solid particulate filter dyes and photographic elements containing such dispersions which have enhanced wash-out rates, leaving little or no stain, have sharp-cutting long-wavelength absorption bands, enhanced covering power, and ease of formulation and manufacture. The microprecipitated dispersions of the invention contain methine oxonol filter dyes having the formula

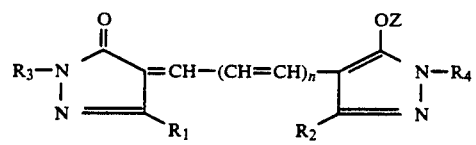

wherein n is 0, 1, or 2; $R_1$, $R_2$, $R_3$, and $R_4$ are the same or different substituted or unsubstituted aryl or alkyl groups, preferably substituted or unsubstituted aryl having 6 to 14 carbon atoms such as phenyl, nitrophenyl, aminophenyl, alkylsulfonamidophenyl, carboxyphenyl, cyanophenyl, tolyl, carboalkoxyphenyl and the like, and lower alkyl groups having from about 1 to 8 carbon atoms such as methyl, ethyl, propyl, isopropyl, butyl, pentyl, hexyl, octyl, cyclohexyl, and the like and mixtures thereof, most preferably having 1 to 3 carbon atoms, with at least one of the R substituents preferably being p-carboxyphenyl (p-$CO_2$Ph—), and one or more of $R_1$, $R_2$, $R_3$, and $R_4$ contains a carboxy substituent —$CO_2^-Z^+$, wherein $Z^+$ is a statistical mixture of protons ($H^+$) and other cations ($M^+$), including alkali cations (such as lithium, sodium, potassium, cesium, rubidium, and the like and mixtures thereof, with sodium and potassium cations being preferred) and tetraalkylammonium cations (with tetramethylammonium cations being preferred) such that $Z^+ = xH^+ + (1-x)M^+$, where x is a decimal ranging from about 0.33 to about 0.95, preferably ranging from 0.55 to about 0.85. (When x=1, the carboxy groups are fully protonated.) Generally, any combination of the groups R as defined above is contemplated provided that the dye has a solubility in water that exceeds about 0.1% by weight at pH 10.

The methine oxonol dyes of the microprecipitated dispersions of the invention are mono-, tri-, and/or penta-methine oxonol filter dyes having a unique physical state due to the amorphous molecular packing of the filter dye in dispersion particles having an average size of less than about 1 micron. The dispersion particles are a collection of dye molecules in amorphous physical state, which collection comprises dyes having variously substituted carboxy groups.

Photographic elements of the invention comprise a support having disposed thereon a radiation sensitive emulsion layer and a layer, which can be the same as or different from the radiation sensitive layer, comprising an amount effective as a photographic filter dye of a microprecipitated dispersion of an oxonol filter dye as defined by the above formula in a vehicle in which the oxonol filter dye dispersion of the invention is substantially insoluble.

The microprecipitated dye dispersions of the invention tend to be insoluble and nondiffusable in hydrophilic colloid layers at a pH of about 6.5 or less. At processing pH values of about 8 or more, the microprecipitated dyes of the invention become soluble and diffuse rapidly in the hydrophilic colloid layers resulting in rapid wash-out with negligible or no stain.

DESCRIPTION OF THE DRAWINGS

FIG. 5. Visible absorption spectra of coated dispersions of Dye 1 prepared as described in Examples 6 to 12. The curves are labelled according to the corresponding Example number. The spectra for Examples (curves) 7 and 8 overlap one another.

MODES FOR CARRYING OUT THE INVENTION

Figure 1:
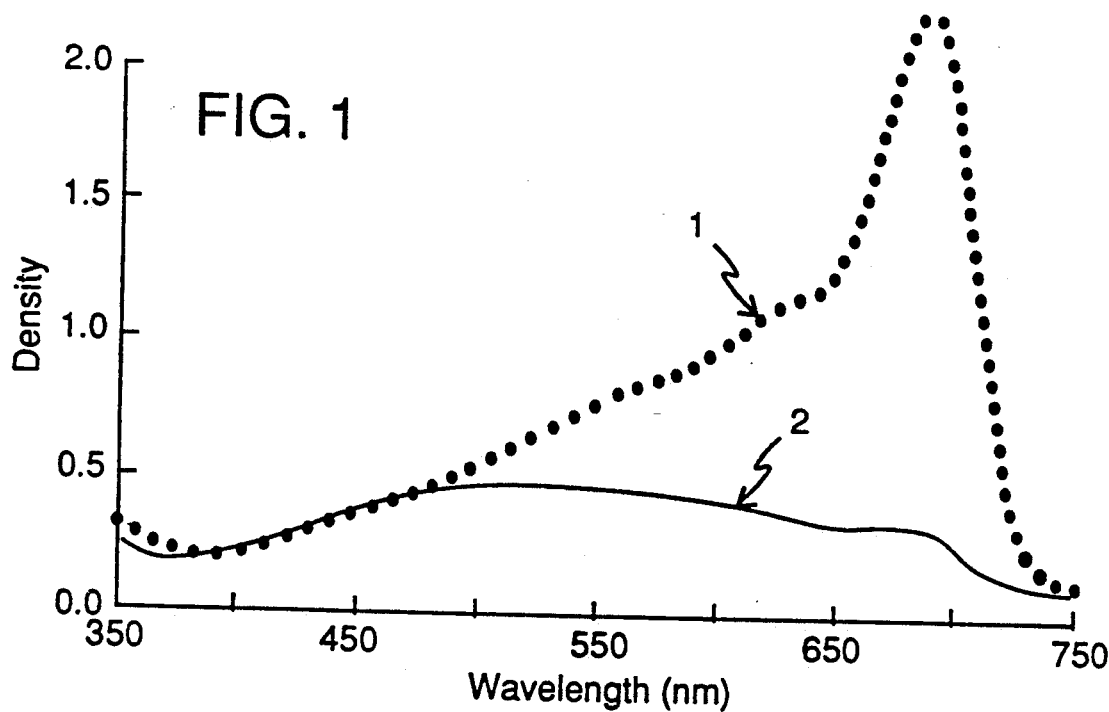
FIG. 1. Visible absorption spectrum (curve 1) of a coated dispersion of Dye 1 prepared as described in Example 1 compared against the spectrum (curve 2) of a milled and fully protonated counterpart of the same dye. In each case, the dispersions were coated onto a substrate in a gelatin single-layer coating containing about 1.61 g/m² gelatin. The coating of the dispersion of the invention contains about 108 mg/m² of Dye 1. The comparison coating (curve 2) contains about 69 mg/m² of the fully protonated counterpart of Dye 1.

The unique filter dye dispersions of the invention and their use in photographic elements offer surprising advantages not heretofore obtainable using known filter dyes incorporated as loaded polymer latexes, oil-in-water dispersions using high-boiling water-immiscible solvents, or even solid particle dispersions of fully protonated filter dyes produced by conventional milling techniques such as roller-milling, sand-milling, media-milling, and so on. This latter point is graphically illustrated in the accompanying figures and examples which compare the absorption spectra of the unique microprecipitated dye dispersions of the invention against the fully protonated counterpart dispersions.

The unique microprecipitated filter dye dispersions of the invention provide enhanced wash-out rates, improved light capturing efficiency, and selectively enhanced and positioned absorption bands relative to dispersions obtained when solid particle dispersion technology is applied to oxonol filter dyes without impairment of any of the other advantages of solid particle dispersions known in the art.

The incorporation of microprecipitated dye dispersions of the invention into photographic elements, substantially obviates the problems encountered when prior methods are used to incorporate dyes such as, for example, dye wandering, photographic speed loss, degradation of color reproduction, retained dye stain, poor light absorbing efficiency and the like.

A concentrated slurry of the methine oxonol filter dye, including supersaturated slurries, in water or a mixture of water and a water miscible organic solvent such as methanol, ethanol, isopropanol, tetrahydrofuran, and the like and mixtures thereof is first prepared. Water is preferred although water mixtures containing less than about 50 volume % of solvent (relative to water), more preferably less than about 10 volume %, most preferably less than about 1 volume %, are also advantageous.

The upper limit of dye concentration in solution will vary with the particular "cation-hydroxide" used to prepare the dye stock solution. Generally, the concentration of dye in the slurry ranges from about 0.1 to 50 weight %, preferably 0.1 to 20 weight %.

Stock aqueous solutions of fully deprotonated methine oxonol dyes are then prepared by adding a suitable hydroxide to the filter dye slurry, preferably under pH-stat conditions, to dissolve the oxonol filter dye. Any suitable alkali hydroxide can be used including the hydroxide of sodium, lithium, potassium, cesium, rubidium, with sodium and/or potassium being preferred. Any suitable tetraalkylammonium hydroxide can be used, with tetramethylammonium hydroxide being preferred.

A solution of the hydroxide in water or a mixture of water and a water miscible solvent such as methanol, ethanol, isopropanol, tetrahydrofuran or the like can be used. Water is preferred although water/solvent mixtures containing less than about 50 volume % of solvent, preferably less than about 10 volume %, are also advantageous.

Under pH-controlled or pH-stat conditions, the bulk slurry or dispersion pH is not permitted to drop below 2. Generally, the pH of the reaction solution or dispersion is continuously measured and preferably maintained constant by automated addition of a pH controlling solution (acid or base depending on whether the pH tends to rise or fall in the absence of the controlling solution). Any suitable acid or base solution can be used for this purpose.

For the purpose of dye dissolution, alkali (base) solution is preferably added by a controller to maintain the high pH necessary for dye dissolution. As the dye dissolves, hydroxide ions are consumed by the protons that come off of the acid sites on the dye. As the aqueous hydroxide ions are consumed thereby, the pH tends to fall. Addition of aqueous hydroxide, preferably at an automatically controlled, not necessarily constant, rate can be made to keep the pH essentially constant.

Any suitable concentration of the hydroxide in solution can be used, preferably concentrations ranging from about 0.1 to 6 molar, particularly when the preferred aqueous sodium hydroxide is employed. Sufficient hydroxide is added to the filter dye slurry to dissolve the filter dye under pH conditions controlled within a range of H from about 8 to 12, preferably 8.5 to 10, to prepare dye stock solutions, preferably containing 0.1–20 weight % (w/w) dye. Such solutions are easily prepared by this process of the invention.

Stabilizers, dispersants, surfactants, or other polymeric colloids or polymeric stabilizers known in the art can be added to such stock solutions as desired.

Any suitable reactor of sufficient volume to accommodate the pH controlled processes of the invention can be used. The reactor should permit the temperature of the reaction mixture to be controlled in a range of from about 15° to 80° C., preferably 20° to 40° C.

Preferably, the reactor also has a high speed stirrer such as a disk affixed to the end of a rotating shaft to provide agitation throughout the microprecipitation procedure. Optionally, the reactor can also be equipped with pH-sensing electrodes so that the rate of acid addition can be controlled to maintain a given pH set-point of range during microprecipitation. The pH set-point range generally ranges from about 3 to 6.5, preferably from about 4.5 to 5.5. A readily obtainable pH controller that provides the desired control features is a Radiometer-Copenhagen model TTT80 titrator. Any other suitable titrator which provides the desired pH and flow control features can also be employed.

Preferably, a suitable reactor is charged with a solution containing a dispersing aid such as a dispersant and/or stabilizer or mixture thereof. Any suitable dispersant and stabilizer can be used including polymeric stabilizers. Preferred dispersing aids are illustrated in Table I.

TABLE I

| | | |
|---|---|---|
| DA-1 | $CH_3-(CH_2)_{11}-SO_4^-Na^+$ | Sodium Dodecyl Sulfate |
| DA-2 | 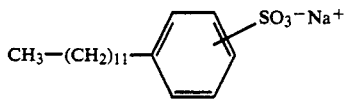 | Sodium Dodecyl Benzene Sulfonate |
| DA-3 | 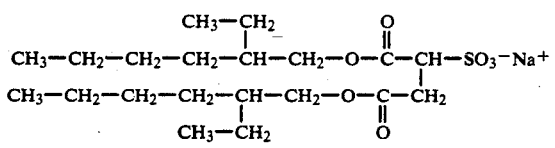 | Aerosol OT (Cyanamid) |
| DA-4 | 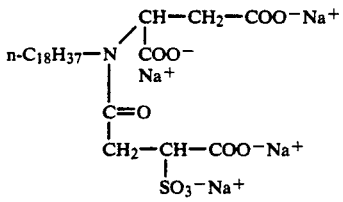 | Aerosol 22 (Cyanamid) |
| DA-5 | 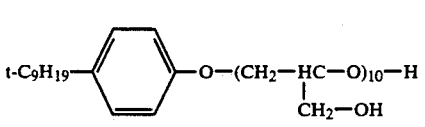 | Olin 10G (Dixie) |
| DA-6 | $n-C_{12}H_{25}-O-(CH_2-CH_2-O)_{12}-SO_3^-Na^+$ | Polystep B-23 (Stepan) |

TABLE I-continued

| | | |
|---|---|---|
| DA-7 | $C_8H_{17}$—⌬—O—(CH$_2$—CH—O)$_{12}$—OH | Triton TX-102 (Rohm & Haas) |
| DA-8 | (diisopropyl naphthalene sulfonate, Na$^+$ salt with three isopropyl groups) | Alkanol-XC (DuPont) |
| DA-9 | R—O—C(=O)—CH—SO$_3^-$Na$^+$<br>R—O—C(=O)—CH$_2$<br>where R = CH(CH$_3$)C$_4$H$_9$ Aerosol MA (Cyanamid) | |
| DA-10 | R = —CH$_2$—CH$_2$—C$_6$H$_5$ | |
| DA-11 | R = —CH$_2$—CH(C$_6$H$_5$)—CH$_3$ | |
| DA-12 | R = —CH$_2$—CH(CH$_2$CH$_3$)C$_3$H$_7$ | |
| DA-13 | R = —(CH$_2$)$_n$CH$_3$ (n = 2, 3 & 5) | |
| DA-14 | R—C(=O)—O—CH—SO$_3^-$Na$^+$<br>R—C(=O)—O—CH<br>R—C(=O)—O—CH$_2$<br>R = —(CH$_2$)$_n$—C$_6$H$_5$ (n = 2 to 5) | |
| DA-15 | n-C$_{12}$H$_{25}$—O—(CH$_2$—CH$_2$—O)$_{23}$—OH | Tricol LAL-23 (Emery) |
| DA-16 | C$_{12}$H$_{25}$—O—(CH$_2$—CH$_2$—O)$_{15}$—CH$_2$<br>                                              CH$_2$—SO$_3^-$Na$^+$ | Avanel S-150 (PPG) |
| DA-17 | n-C$_{12}$H$_{25}$—O—(CH$_2$—CH$_2$—O)$_n$—C(=O)—CH—SO$_3^-$Na$^+$<br>                                              CH$_2$—COO$^-$Na$^+$<br>n = 3-5 | Aerosol A102 (Cyanamid) |
| DA-18 | t-C$_9$H$_{19}$—⌬—O—(CH$_2$—CH$_2$—O)$_n$—C(=O)—CH—SO$_3^-$Na$^+$<br>                                              CH$_2$—COO$^-$Na$^+$<br>n = 5-10 | Aerosol A103 (Cyanamid) |

TABLE I-continued

DA-19

$$R-\underset{R}{\overset{CH_2NH-\overset{O}{\overset{\|}{C}}-(CHOH)_p-CH_2-OH}{\underset{CH_2-NH-\overset{O}{\overset{\|}{C}}-(CHOH)_p-CH_2-OH}{C}}}$$

where, $R = n\text{-}CH_3-(CH_2)_x-$ (where $x = 3$ to 10)

DA-20

$$R = \underset{}{\underset{}{\bigcirc}}-CH_2-CH_2-$$

$p = 3$ to 10

DA-21

$$R-\underset{R}{\overset{CH_2NH-\overset{O}{\overset{\|}{C}}-(CHOH)_p-CH_2OH}{\underset{CH_2OH}{C}}}$$

where, $R = n\text{-}CH_3-(CH_2)_x-$ (where $x = 3$ to 10)

DA-22

$$R = \underset{}{\underset{}{\bigcirc}}-CH_2-OH$$

$p = 3$ to 15

DA-23

$$CH_3-(CH_2)_n-NH\underset{HO}{\overset{CH_2OH}{\underset{HO}{\overset{O}{\diagup}}}}\underset{HO}{\overset{O}{\diagup}}\underset{HO}{\overset{CH_2OH}{\underset{HO}{\overset{O}{\diagup}}}}OH$$

where, $n = 3$ to 15

DA-24

$$R-\underset{}{\underset{}{\bigcirc}}\underset{OCH_2-CH-CH_2-N-CH_2-(CH)_4-CH_2OH}{\overset{OCH_2-\overset{OH}{\underset{}{C}}H-CH_2-\overset{CH_3}{\underset{}{N}}-CH_2-\overset{OH}{\underset{}{(CH)_2}}-CH_2OH}}$$

where, $R = n\text{-}CH_3-(CH_2)_x-$ (where $x = 1$ to 5)

DA-25

$$CH_3-(CH_2)_n-O-CH_2-\overset{OH}{\underset{|}{C}H}-CH_2-NH-\overset{O}{\overset{\|}{C}}-(CHOH)_4CH_2OH$$

where, $n = 3$ to 15

DA-26

$$CH_3-(CH_2)_n-\overset{CH_2-OCH_2-\overset{OH}{\underset{|}{C}H}-CH_2-NH-\overset{O}{\overset{\|}{C}}-(CHOH)_p-CH_2OH}{\underset{CH_2-OCH_2-\overset{}{\underset{|}{C}H}-CH_2-NH-\overset{}{\underset{\|}{C}}-(CHOH)_p-CH_2OH}{CH}}$$
$$\phantom{CH_3-(CH_2)_n-CH_2-OCH_2-}\overset{}{\underset{OH}{\phantom{C}}}\phantom{-CH_2-NH-}\overset{}{\underset{O}{\phantom{C}}}$$

where, $n = 2$ to 12
$p = 3$ to 10

DA-27

$$CH_3-(CH_2)_n-\overset{O}{\overset{\|}{C}}-\underset{\underset{CH_2-NH-\overset{O}{\overset{\|}{C}}-(CHOH)_p-CH_2OH}{\overset{CH_2}{\underset{|}{C}H_2}}}{\overset{\overset{CH_2-NH-\overset{O}{\overset{\|}{C}}-(CHOH)_p-CH_2OH}{\underset{|}{C}H_2}}{N}}$$

where, $n = 2$ to 18
$p = 3$ to 10

TABLE I-continued

DA-28
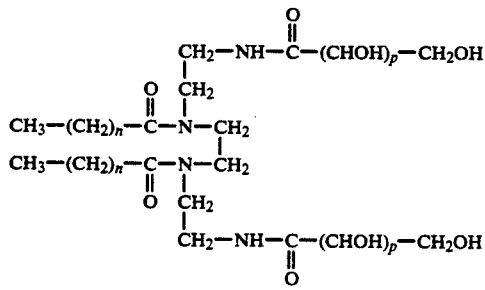

where, n = 2 to 18
p = 3 to 10

| | | | Molecular Weight Range |
|---|---|---|---|
| DA-29 | Pluronic TM Polyois (BASF) | 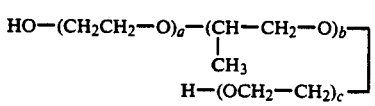 | 1,100 to 14,000 |
| DA-30 | Pluronic TM-R Polyois (BASF) | 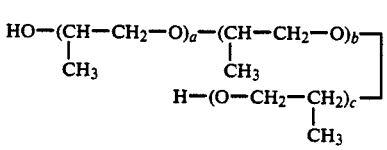 | 1,100 to 14,000 |
| DA-31 | Plurodot TM Polyois (BASF) | Liquid Polyethers Based on Alkoxylated Triols | 3,200 to 7,500 |
| DA-32 | Tetronic TM Polyois (BASF) | 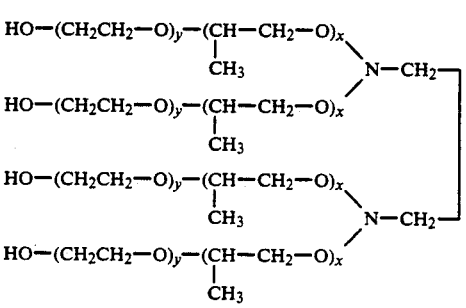 | 3,200 to 27,000 |

DA-33 (TX200)
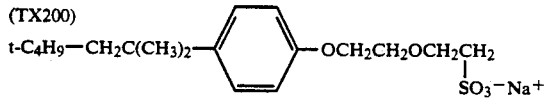

DA-34 (OMT)
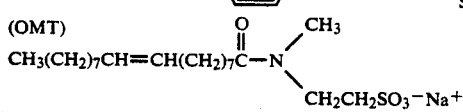

Other preferred surfactants and stabilizers can be derived from the filter dyes themselves by esterification of a polymeric colloid such as a low or intermediate molecular weight polyethylene oxide or polyvinylalcohol with one or more of the carboxy groups on the filter dye. Other preferred surfactants and stabilizers can be derived from the filter dye by amidation of a polymeric colloid such as a low or intermediate molecular weight polyacrylamide with one or more of the carboxy groups on the filter dye. Other preferred polymeric stabilizers include gelatin, derivatized gelatins, polyvinylalcohol, polyvinylpyrrolidone, polyethyleneoxide, polyacrylates, polyacrylamides, and the like. Various block copolymers can also be employed including polyethyleneoxide-polyacrylamide copolymers, for example. Any suitable amounts of dispersing aids can be employed, preferably totalling from about 0.01 to about 250% (w/w) of the amount of dye microprecipitated, more preferably from about 5 to about 100%.

The microprecipitated dye dispersion particles of the invention can be produced by acidifying the deprotonated dye feed stock solution. Any suitable batch or continuous method can be used to acidify the dye. A suitable batch method comprises introducing a steady stream of dye stock solution into a reactor containing aqueous dispersion aids and injecting a stream of any suitable acid such as aqueous HCl, $H_2SO_4$, and the like, into the reactor simultaneously to reach and maintain the appropriate pH using a double-jet precipitation technique. Alternatively, a given quantity of dye stock solution can be placed in the reactor, and an acid stream can be introduced in a single-jet precipitation mode in order to reach and maintain the appropriate pH over the desired reaction-time interval. An appropriate pH generally ranges from about 3 to about 6.5, preferably 4.5 to 5.5. The desired reaction-time interval is the length of time over which acid is added plus the time the dispersion is allowed to equilibrate in the reactor following cessation of acid addition.

Any suitable continuous precipitation technique can also be employed using any suitable continuous precipitation reactor with stoichiometric/pH control (implicit in the bounds on Z). In all cases, the stoichiometric amount of acidic protons added to reprotonate the dye molecules in the resulting dispersion in accordance with the invention is such that 33 to 95%, preferably 55 to 85%, of the total ionizable (carboxy or hydroxy) sites on the dye molecules are reprotonated.

The mean diameter of the particles of filter dye in the microprecipitated dispersions of the invention range from about 3 to about 1000 nm, preferably from about 5 to about 100 nm.

The microprecipitated filter dye dispersions of the invention can be prepared in any suitable vehicle in which the filter dye dispersion has a solubility of less than about 0.05 weight % (w/w) such as, for example, those disclosed in U.S. Pat. No. 4,425,426, which is hereby incorporated herein by reference in its entirety, and Research Disclosure Section IX, and the publications cited therein, including an aqueous liquid having a pH low enough for the filter dye molecules to be insoluble, an organic solvent in which the filter dye is substantially insoluble, a monomer, or a polymeric binder or hydrophilic colloid. A gelatin solution is a preferred hydrophilic colloid.

Photographic elements of the invention comprise a support having disposed thereon a radiation sensitive emulsion layer and a layer, which can be the same as or different from the radiation sensitive layer, comprising an amount effective as a photographic filter dye of a microprecipitated oxonol filter dye dispersion of the invention applied in a vehicle in which the oxonol filter dye dispersions of the invention are substantially insoluble.

In the photographic elements of the invention, the oxonol filter dye dispersions described herein can be located in any layer of the element in which it is appropriate to attenuate the transmission of light of a given wavelength, such as filter dye interlayers and antihalation layers, for example.

Any amount of the oxonol filter dye dispersions of the invention effective for their function as a photographic filter dye can be incorporated into a photographic element. Useful amounts of dispersed dye which can be incorporated range from about 0.01 to about 10.7 g/m$^2$ in a given layer. Preferably, the filter dye dispersion particle size should be less than about 1000 nm, more preferably less than about 100 nm. Small particles having sizes of 10 nm or less are most preferred.

Any suitable support can be used in the photographic elements of the invention. Some such suitable supports include cellulose esters such as, for example, cellulose triacetate, cellulose diacetate, and the like; polyesters of dibasic aromatic carboxylic acids with divalent alcohols such as, for example, poly(ethylene terephthalate); paper, polymer-coated paper, and the like.

The radiation-sensitive layer of the photographic elements of the invention can contain any suitable radiation-sensitive material such as, for example, silver halide or other light sensitive silver salts. Silver halide is preferred. Silver halide emulsions can contain silver bromide, silver chloride, silver iodide, silver chloroiodide, silver chlorobromide, silver bromoiodide, and the like and mixtures thereof. The radiation-sensitive emulsion layer can include coarse, medium, or fine silver halide grains bounded by 100, 111, or 110 crystal planes. Also useful are tabular grain silver halide emulsions.

The radiation-sensitive materials of the photographic elements of the invention can be sensitized to a particular wavelength range such as the red, blue, or green portions of the visible spectrum, or to other wavelength ranges as desired such as, for example, ultraviolet, infrared, X-ray, and the like. Sensitization of silver halide can be accomplished with chemical sensitizers such as gold compounds, iridium compounds, or other group VIII metal compounds, or with spectral sensitizing dyes such as cyanine dyes, merocyanine dyes, or other known spectral sensitizers.

Multicolor photographic elements of the invention generally comprise a blue-sensitive silver halide layer having a cyan color-forming coupler associated therewith. Any suitable color photographic elements and color-forming couplers can be used.

Photographic elements of the invention may comprise any suitable type and number of layers such as, for example, overcoat layers, interlayers, barrier layers, antistatic layers, antihalation layers, and the like. The elements can also contain any suitable additives such as for example, optical brighteners, antifoggants, image stabilizers, light-absorbing materials such as filter layers of intergrain absorbers, light-scattering materials, gelatin hardeners, oxidized developer scavengers, plasticizers, lubricants, matting agents, development-inhibitor releasing couplers, bleach accelerator-releasing couplers, and the like and mixtures thereof.

When exposed, the photographic elements of the invention can be processed to produce an image. During processing, the microprecipitated oxonol filter dye dispersions of the invention will generally be solubilized and undergo a sequence of dissolution and bleaching reactions in which any filter dye remaining in the photographic element is decolorized.

The photographic elements of the invention can be processed by any suitable method, preferably including a high pH and a nucleophile such as a sulfite or metabisulfite. A negative image can be developed by color development using one or more suitable processes. A positive image can be developed by first developing with a nonchromogenic developer, then uniformly fogging the element and then developing using any suitable color forming developer or by incorporating a color forming coupler in the developer solution.

Any suitable bleaching and fixing materials can be used for that purpose. Bleach baths generally comprise an aqueous solution of an oxidizing agent such as water soluble salts and complexes of iron (III) including, for example, potassium ferricyanide, ferric chloride, ammonium or potassium salts of ferric ethylenediaminetetraacetic acid; water soluble persulfates such as, for example, potassium, sodium, and ammonium persulfate; water soluble dichromates such as, for example, potassium, sodium, lithium dichromate and the like and mixtures thereof. Fixing baths generally comprise an aqueous solution of compounds that form soluble salts with silver ions such as sodium thiosulfate, ammonium thiosulfate, potassium thiocyanate, sodium thiocyanate, thioureas, and the like and mixtures thereof.

Any of the supports, radiation-sensitive layers, sensitizers, multicolor elements, and other additives and processing procedures and materials described in U.S. Pat. Nos. 4,362,806; 4,425,426; 4,092,168; 4,855,221 and the like, for example, can also be employed.

The invention is further illustrated but is not intended to be limited by the following examples in which all parts and percentages are by weight unless otherwise specified.

EXAMPLE 1

Preparation of Dye 1

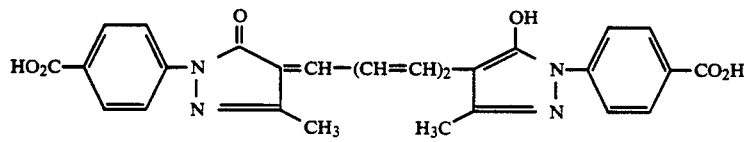

Fully Protonated Dye 1

About 100 ml ethanol, about 10 ml triethylamine, about 5.7 g (20 mmol) glutacondialdehyde dianil hydrochloride, and about 8.7 g (40 mmol) of 1-(p-carboxyphenyl)-3-methyl-2-pyrazolin-5-one were combined and heated at reflux for about 10 minutes before being chilled in ice. No precipitate formed after 30 minutes. The blue solution was diluted with an additional 200 ml of ethanol and the cold solution stirred rapidly as excess concentrated HCl was added over about 30 seconds. A precipitate formed immediately. The resulting slurry was stirred for about 30 minutes, filtered, washed with ethanol, ligroin, and sucked dry to give about 9.6 g of black powder ($\lambda_{max} \approx 625$ nm in methanol). This crude dye was dissolved in about 100 ml ethanol and 5 ml triethylamine (3.7 g; 35 mmol) with refluxing. About 8.5 g NaI (54 mmol) dissolved in about 40 ml methanol was added and allowed to cool until just warm with stirring. The resulting solution was then filtered to collect solids and washed with 100 ml ethanol, 50 ml methanol, and dried to yield about 8.3 g dye. The resulting intermediate product (7.3 g) was pulverized to a fine powder, refluxed with about 150 ml of methanol for about 30 minutes, and then filtered while hot and sucked dry overnight to yield about 6.9 g of intermediate product. This dye intermediate was dissolved in about 300 ml of methanol and 10 ml triethylamine at reflux. To this solution was then added about 100 ml water and about 10 ml concentrated HCl (*a ten-fold molar excess*). The resulting slurry was stirred for about 10 minutes, filtered while hot, washed with ethanol, methanol, diethylether, and dried to yield 5.32 g of fully protonated Dye 1.

Microprecipitated Dispersion of Dye 1

An ultra-fine particle sized dispersion of Dye 1 was prepared using a REC-80/TTT-80 automatic titration system (Radiometer, Copenhagen) in a double-jet precipitation mode. The pH of the product dispersion was maintained at about 5.2 automatically with 2N $H_2SO_4$ solution over the course of the precipitation. A stock solution of Dye 1 at a concentration of about 0.073M was prepared by dissolving an aqueous slurry of the fully protonated dye at pH 9 with dropwise addition of 2N aqueous NaOH.

The reactor was maintained at about 60° C. and was initially charged with about 50 ml of an aqueous solution containing about 27 g (12.5%) gelatin, about 1.5 g (10%) of dispersing aid DA-8 in about 119 g water. The reactor solution was continuously stirred with a rotating disk stirrer at about 1500–3000 rpm.

Dye 1 stock solution was injected into the reactor at a volume flow-rate of about 0.5 ml/min. A total of about 20 ml of Dye 1 (1.47 mmol) stock solution was added to the reactor. The sulfuric acid stock solution (2N) was added automatically over the course of the reaction (1.42 ml; 2.84 mmeq) to maintain the pH constant at about 5.2 ($\pm 0.2$). The parameter Z corresponds to a reprotonation fraction, x, of 0.644 ($1-x=0.356$). After precipitation was complete, the resulting dispersion was placed in cold storage until used for coating.

Comparison Dispersion

A comparison dispersion was prepared by roller milling fully protonated Dye 1 as described in detail in U.S. Pat. No. 4,092,168 and WO 88/04794.

Coating and Evaluation of Dispersions

Dispersions of Dye 1 described above were coated in a single layer format containing about 1.61 g/m² gelatin (hardened with 1,1'-[methylenebis{sulfonyl}]bisethene at about 1.5% (w/w) of total gelatin) at dye coating coverages of about 69 mg/m² (Comparison) and 108 mg/m² (Microprecipitated Dispersion of the Invention). Coating melts were adjusted to pH 5.2 before coating. The absorption envelopes obtained for these dispersions are shown in FIG. 1. These dispersions have dramatically different light absorption envelopes and dramatically different light absorption efficiencies at wavelengths greater than 550 nm. These differences are most noticeable at the peak wavelength of 690 nm for the dispersions of this example.

Covering Power (CP) is defined as the optical absorbance at a given wavelength divided by the coated level of filter dye in mg/m². By this definition, the coated dispersion of the invention has a CP of 0.020 at the wavelength maximum (690 nm); the comparison dispersion has a CP of 0.005 at the absorption maximum of approximately 500 nm.

EXAMPLE 2

Preparation of Dye 2

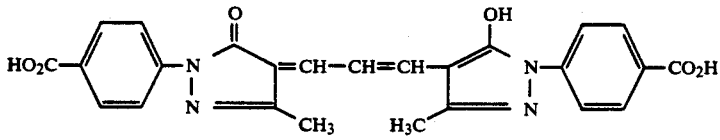

Fully Protonated Dye 2

About 8 g of trimethoxypropane, about 22 g of 1-(p-carboxyphenyl)-3-methylpyrazolone, about 100 ml ethanol, and about 14.5 g or 20 ml triethylamine were combined and refluxed for about 30 minutes. The mixture was chilled, combined with about 200 ml methanol, and then combined with about 40 ml concentrated HCl. A red precipitate formed immediately. The mixture was stirred at room temperature for about 15 minutes and filtered. The precipitate was washed with about 300 ml ethanol, 1000 ml methanol, 1000 ml diethylether, and then air dried to yield a dry weight of about 12.4 g. The precipitate was then purified through a number of washing and dissolution/recrystallization steps. The precipitate was first slurried in about 500 ml refluxing glacial acetic acid, cooled to room temperature, filtered, washed with about 250 ml acetic acid, 250 ml water, 250 ml methanol, and then dried. It was then dissolved in about 100 ml hot diethylsulfoxide and cooled to about 40° C. About 300 ml methanol was then added, upon which a red precipitate formed. The precipitate was filtered, washed with methanol, acetone, and ligroin, and dried. The precipitate was dissolved in about 200 ml methanol and 6 ml (4.38 g) of triethylamine and heated to reflux. About 5 ml of concentrated HCl were added and a fine red precipitate formed. The solution was filtered while hot and the precipitate was washed with methanol and acetone and dried. The precipitate was then dissolved in a refluxing mixture of about 200 ml ethanol and 6 ml (4.38 g) triethylamine. About 9 g of sodium iodide dissolved in about 50 ml ethanol were added. A red precipitate formed upon cooling. The mixture was chilled in ice for one hour and filtered. The precipitate was washed with ethanol, ligroin, and dried to yield the sodium salt of the desired dye. This salt was dissolved in about 200 ml water with rapid stirring. About 6 ml of concentrated HCl (*a three-fold molar excess*) were added and a fluffy red precipitate formed. The mixture was filtered and the precipitate was washed with water, methanol, acetone, and ligroin, then dried to yield fully protonated Dye 2.

Microprecipitated Dispersion of Dye 2

About 4.9 g (0.0104 mol) of fully protonated Dye 2 were pulverized with a mortar and pestle and added to a tared 300 ml beaker with about 110 ml distilled water. The initial pH of the resulting slurry was about 5.1.

About 15 ml aqueous NaOH (2N, 0.031 eq) were added automatically to the slurry of fully protonated Dye 2 to bring the pH to 9. The resulting feed stock solution was then acidified with 2N $H_2SO_4$ in the presence of a stabilizer as follows:

The reactor of Example 1, charged with about 5.5 g of a 5 weight % solution of polyvinyl alcohol (PVA; mol. wt. about 11,000 to about 31,000) in water with additional water sufficient to provide a total initial weight of about 40 g of solution in the reactor, was maintained at a temperature of about 24° C. The initial pH was about 5.3. The reactor was stirred continuously with a disk stirrer at 1000–3000 rpm.

About 40 ml of the feed stock solution of Dye 2 were injected into the reactor at a volume flow rate of about 1 ml/min. Sulfuric acid (2N, 2.8 ml, 5.62 meq) was added automatically over the course of the reaction to maintain the pH constant at 5.2 (±0.2). The PVA/Dye 2 concentration was 1.67% (w/w). The parameter Z for the resulting average dye structure in the dispersion corresponds to a fraction of reprotonation, x, of 0.637 ([1−x]=0.363). When precipitation was complete, the resulting dispersion was placed in cold storage until used for coating.

Comparison Dispersion

A comparison dispersion was prepared by roller milling fully protonated Dye 2 as described in U.S. Pat. No. 4,855,221 and WO 88/04794.

Coating and Evaluation of Dispersions

Figure 2:
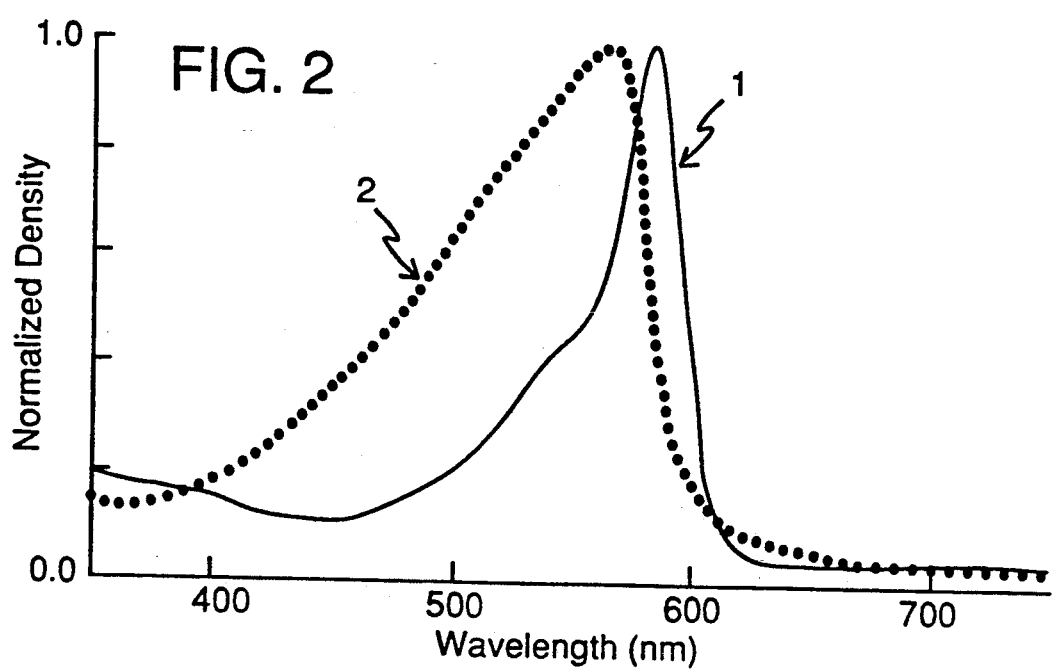
FIG. 2. Visible absorption spectrum (curve 1) of a coated dispersion of Dye 2 prepared as described in Example 2 compared against the spectrum (curve 2) of a roller milled and fully protonated counterpart of the same dye. The dispersions were coated onto a support as a gelatin single-layer coating containing about 1.61 g/m² of gelatin. The coating of the dispersion of the invention contains about 44 mg/m² of Dye 2. The comparison coating (curve 2) contains about 116 mg/m² of the fully protonated counterpart of Dye 2. The density scale is normalized. The absorbance for Dye 2 (curve 1) is 1.74 at the peak maximum of 582 nm. The peak absorbance for the fully protonated counterpart (curve 2) is 1.85 at 564 nm.

Dispersions of Dye 2 described above were coated in a single layer format containing about 1.61 g/m² gelatin (hardened with 1,1'-[methylenebis{sulfonyl}]bisethene at about 1.5% (w/w) of total gelatin) at dye coating coverages of about 116 mg/m² (Comparison) and 44 mg/m² (Microprecipitated Dispersion of the Invention). Coating melts were adjusted to pH 5.2 before coating. The absorption envelopes obtained for these dispersions are shown in FIG. 2. These dispersions have dramatically different light absorption envelopes and dramatically different light absorption efficiencies at wavelengths greater than 550 nm. These differences are most noticeable at the peak wavelength of 582 nm for the dispersions of this example.

Covering Power (CP), defined as in Example 1, for the coated dispersion of the invention is 0.031 at the wavelength maximum (582 nm); the comparison dispersion has a CP of 0.016 at the absorption maximum of approximately 564 nm. The difference corresponds to an almost 100% greater light capturing efficiency at the peak maximum for the dispersion of the invention compared to that of the comparison dispersion. The dispersion of the invention also has a significantly narrower bandwidth (full width at half maximum intensity [FWHM] of 36 nm) than the comparison dispersion (FWHM about 104 nm). The dispersion of the invention also provides a much sharper cutting absorption band on the long wavelength side.

EXAMPLE 3

Preparation of Dye 3

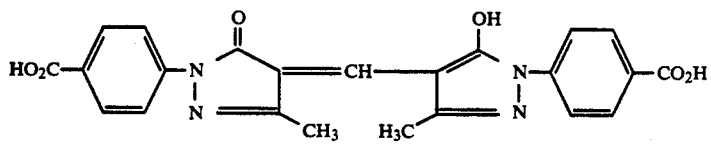

Fully Protonated Dye 3

About 50 ml of acetic anhydride, 6 g (40 mmol) of ethylorthoformate, and 6.5 g (30 mmol) of 1-(p-carboxyphenyl)-3-methyl-2-pyrazolin-5-one were combined and refluxed for about 15 minutes. The reaction mixture was then immediately chilled in ice and kept on ice for about 30 minutes, filtered, washed with methanol, and dried to yield about 6.3 g of a golden yellow powder (wavelength maximum=430 nm). The powder was recrystallized from about 150 ml refluxing acetic anhydride, washed with methanol, washed with ligroin, and dried in a vacuum oven to yield about 3.2 g of product.

Microprecipitated Dispersion of Dye 3

About 102 g (0.446 mol) of the sodium salt of metasulfobenzoic acid (MSBA) and about 510 g (1.275 mol) polyethyleneoxide (PEO) having a molecular weight of about 400 were placed in a round bottomed flask, purged continuously with nitrogen, and heated to about 220° C. for about 19 hours using a salt bath to esterify the MSBA with the PEO. The resulting dispersing aid, A-1, had an acid number of 0.005 meq/g (2.4 meq/mol) indicating that the esterification of the carboxy group went to about 99.3% completion.

About 41 g (0.092 mol) of fully protonated Dye 3, about 88 g A-1, and about 65 g of PEO having a molecular weight of about 6000 (PEO-6000, 0.011 mol) were mixed in a round bottomed flask, heated to about 220° C. for about 24 hours under nitrogen with stirring, and cooled. The resulting mixture is designated A-2.

A-2, A-1, and PEO-6000 were mixed at mol ratios of Dye 3:MSBA:PEO-6000 corresponding to 0.092:0.142:0.011. About 2.56 g of the resulting solid mixture were slurried in about 100 ml distilled water (pH about 3.9) and then dissolved with about 2.7 ml of 2N NaOH at pH 10. The solution was then acidified by the addition of about 1.44 ml of 2N $H_2SO_4$ to pH 5.3. The parameter Z corresponds to a fraction of reprotonation, x, of 0.53 ([1−x]=0.47). The resulting dispersion was stored at room temperature until used.

Comparison Dispersion

A comparison dispersion was prepared by roller milling fully protonated Dye 3 as described in U.S. Pat. No. 4,092,168 and WO 88/04794.

Coating and Evaluation of Dispersions

Figure 3:
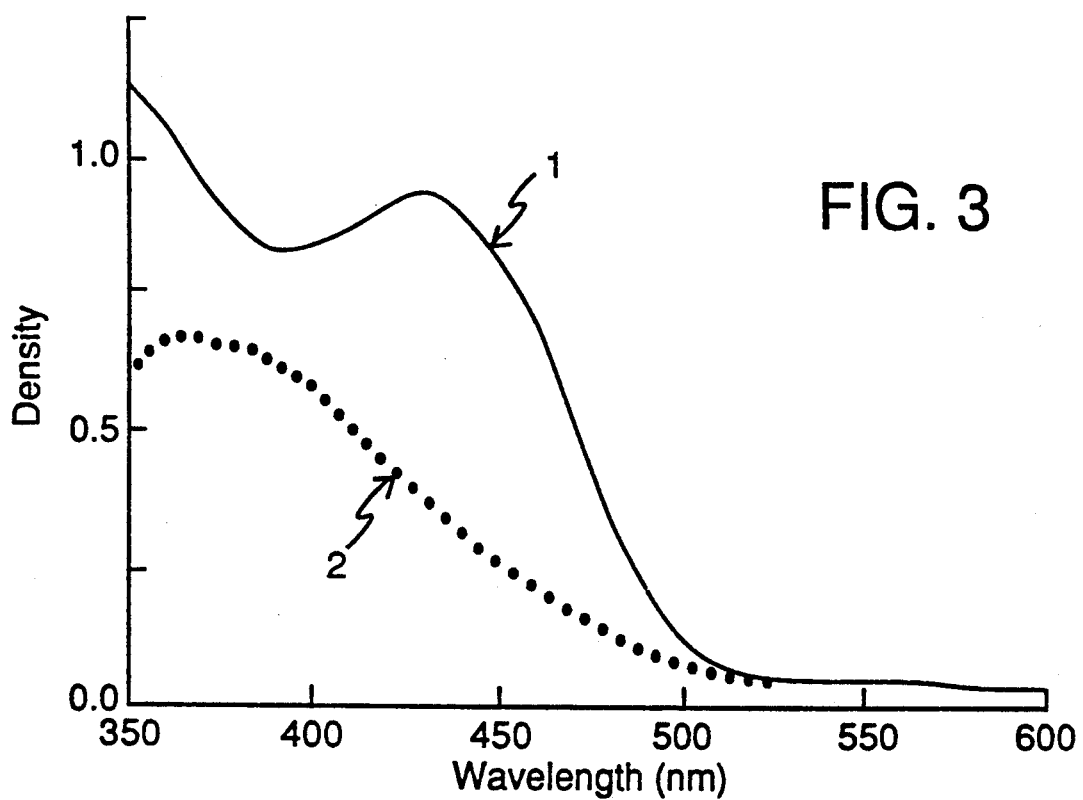
FIG. 3. Visible absorption spectrum (curve 1) of a coated dispersion of Dye 3 prepared as described in Example 3 compared against the spectrum (curve 2) of a roller milled and fully protonated counterpart of the same dye. The dispersions were coated onto a support as a gelatin single layer coating containing about 1.61 g/m² of gelatin. The coating of the dispersion of the invention contains about 256 mg/m² of Dye 3. The comparison coating (curve 2) contains about 157 mg/m² of the fully protonated counterpart of Dye 3. The long-wavelength absorption peak for Dye 3 (curve 1) is at 434 nm. The peak wavelength for the fully protonated counterpart (curve 2) is at 366 nm.

Dispersions of Dye 3 described above were coated in a single layer format containing about 1.61 g/m² gelatin (hardened with 1,1′-[methylenebis{sulfonyl}]bisethene at about 1.5% (w/w) of total gelatin) at dye coating coverages of about 157 mg/m² (Comparison) and 256 mg/m² (Microprecipitated Dispersion of Dye 3). Coating melts were adjusted to pH 5.2 before coating. The absorption envelopes obtained for these dispersions are shown in FIG. 3. These dispersions have dramatically different light absorption envelopes and dramatically different light absorption efficiencies at wavelengths greater than 400 nm. These differences are most noticeable at the long wavelength peak of 434 nm for the dispersions of this example.

Covering Power (CP), defined as in Example 1, for the coated dispersion of the invention is 0.0036 at the long wavelength maximum (434 nm); the comparison dispersion has a CP of 0.0044 at the absorption maximum of approximately 366 nm. The dispersion of the invention provides a much sharper cutting absorption band on the long wavelength side. This long wavelength peak and greater long wavelength light absorbing efficiency make the dispersion of this invention more useful as a near-ultraviolet filter dye dispersion.

EXAMPLE 4

Preparation of Dye 4

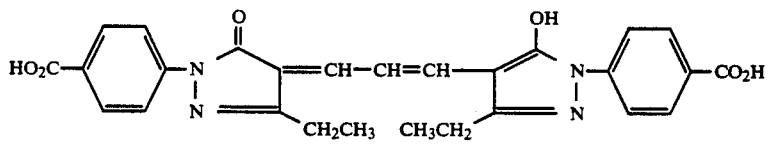

Fully Protonated Dye 4

The intermediate 1-(p-carboxyphenyl)-3-ethyl-2-pyrazolin-5-one was first prepared by combining about 50 ml of glacial acetic acid, about 11.5 g (80 mmol) of ethyl propionylacetate, and about 11 g (73 mmol) of p-hydrazinobenzoic acid and heating to reflux with stirring. Complete dissolution occurred in about 15 minutes. Subsequently, a tan precipitate formed spontaneously. The mixture was heated at reflux for about 2.5 hours and then stirred overnight at room temperature. The resulting crude intermediate was filtered, washed with about 100 ml water, 100 ml ethanol, 100 ml ether, and ligroin, and then suctioned on a Buchner funnel for about 1 hour to yield a tan powder having a melting point of 245°-247° C. The powder was dried in a vacuum oven at about 100° C. for about 3 hours to yield 14.5 g of the intermediate.

About 2.6 g (10 mmol) of anilino acrolein anil hydrochloride were added to a solution of about 4.6 g (20 mmol) of the intermediate in about 20 ml of dimethylformamide, 5 ml methanol, and 5 g (6.8 ml, 50 mmol)

triethylamine with stirring at room temperature. Stirring was continued, monitored by UV-VIS spectrophotometry. All of the anilino acrolein anil hydrochloride was consumed after about 2 hours ($\lambda_{max} \approx 528$ nm). After about 2.5 hours at room temperature, the reaction mixture was poured into about 100 ml of 10% aqueous HCl (an approximately *ten-fold equivalent excess*) with rapid stirring. The reddish-orange precipitate which formed was washed with about 100 ml water and yielded a colorless filtrate. The precipitate was washed with about 200 ml methanol and suctioned dry on a Buchner funnel overnight to yield about 4.9 g of brick-red crystals. This crude product was slurried in about 200 ml of refluxing methanol for about 1 hour, filtered, and dried to yield about 4.5 g (9 mmol, 90% yield) product.

Microprecipitated Dispersion of Dye 4

About 5 g of fully protonated Dye 4 were pulverized with a mortar and pestle and then added to a tared 250 ml beaker with about 100 ml water. The initial pH of the slurry was about 3° at 24° C. NaOH (2N) was added automatically to this slurry to bring the pH to a constant 8.8. This Dye 4 feed stock solution was then acidified with 2N $H_2SO_4$ in the presence of a stabilizer as follows:

The reactor of Example 1 maintained at about 24° C. was charged with a mixture of about 27.6 g of a 5% solution of polyvinyl alcohol (PVA; about 11,000 to about 31,000 mol wt) in about 12.4 g water. The reactor solution was stirred continuously with a rotating disk stirrer at about 1500–3000 rpm and the initial pH adjusted to 5.23. Thereafter, the pH was maintained at 5.2 ($\pm 0.1$) using the pH-stat mode of the automatic titration delivery system described in Example 1.

A total of about 30 ml of Dye 4 feed stock solution (2.76 mmol corresponding to 8.28 meq of deprotonated acid sites) were added to the reactor at a volume flow rate of about 1 ml/min. About 3 ml (6.28 meq) of sulfuric acid solution were added automatically over the course of the reaction to maintain the pH constant at 5.2 ($\pm 0.1$). The resulting dispersion had a PVA/Dye 4 weight ratio of about 1:1. The final Dye 4 concentration was about 1.89%. The parameter Z corresponds to a fraction of reprotonation, x, of 0.758 ($[1-x]=0.242$). When precipitation was complete, the resulting dispersion was placed in cold storage until used for coating.

Comparison Dispersion

A comparison dispersion was prepared by milling fully protonated Dye 4 according to methods described in U.S. Pat. No. 4,855,221.

Coating and Evaluation of Dispersions

Figure 4:
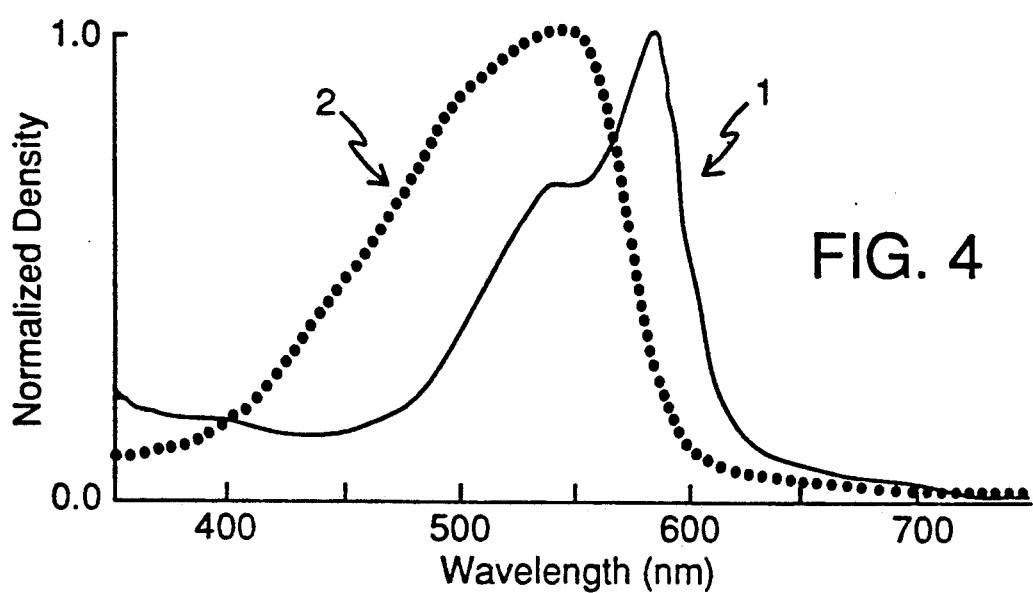
FIG. 4. Visible absorption spectrum (curve 1) of a coated dispersion of Dye 4 prepared as described in Example 4 compared against the spectrum (curve 2) of a roller milled and fully protonated counterpart of the same dye. The dispersions were coated onto a support as a gelatin single layer coating containing about 1.61 g/m² of gelatin. The coating of the dispersion of the invention contains about 52 mg/m² of Dye 4. The comparison coating (curve 2) contains about 62 mg/m² of the fully protonated counterpart of Dye 4. The density scale is normalized. The absorbance for Dye 4 (curve 1) is 0.80 at the peak maximum of 580 nm. The absorbance for the fully protonated counterpart (curve 2) is 0.70 at 547 nm.

Dispersions of Dye 4 described above were coated in a single layer format containing about 1.61 g/m$^2$ gelatin (hardened with 1,1'-[methylenebis{sulfonyl}]bisethene at about 1.5% (w/w) of total gelatin) at dye coating coverages of about 62 mg/m$^2$ (Comparison) and 52 mg/m$^2$ (Microprecipitated Dispersion of Dye 4). The absorption envelopes obtained for these dispersions are illustrated in FIG. 4. These dispersions have dramatically different light absorption envelopes and dramatically different light absorption efficiencies at wavelengths greater than 550 nm. These differences are most noticeable at the peak wavelength of 580 nm for the dispersions of this example.

Covering Power (CP), defined as in Example 1, for the coated dispersion of the invention is 0.016 at the wavelength maximum (580 nm); the comparison dispersion has a CP of 0.011 at the absorption maximum of approximately 547 nm. The dispersion of the invention provides an absorption envelope which is sharper cutting on the long wavelength side. The dispersion of the invention yields an absorption envelope which is considerably narrower with a full width at half maximum (FWHM) of 73 nm compared to a FWHM of 129 nm for the comparison example.

EXAMPLE 5

Comparison of Wash-Out Rates

By way of illustration, coatings of Microprecipitated Dispersions of Dye 2 and the Comparison Dispersion of Example 2 were prepared as described in Example 2 and examined for wash-out rate as a function of pH.

Circular punches of the coatings were mounted in an optical flow cell inserted into a recording spectrophotometer. Potassium phosphate buffers were circulated past the film punches and absorbance monitored as the dyes washed out of the film punch. The time for the peak dye absorbance to decrease to 50% of the starting value is the $t_{\frac{1}{2}}$ or half-life. Half-life values measured for the coated microdispersion of Dye 2 and the comparison dispersion are shown in Table II. The data clearly demonstrate that the filter dye of the microprecipitated dispersion of the invention washes out at a rate approximately 2 to 2.5 *orders of magnitude* faster than the comparison dispersion.

TABLE II

| Dispersion | pH | $t_{\frac{1}{2}}$(seconds) | log ($t_{\frac{1}{2}}$/s) |
| --- | --- | --- | --- |
| Microprecipitated | 4.6 | 4192.45 | 3.62 |
| | 5.13 | 682.80 | 2.83 |
| | 5.42 | 120.36 | 2.08 |
| | 5.74 | 16.51 | 1.22 |
| | 6.01 | 9.31 | 0.97 |
| Comparison | 5.00 | 73805.7 | 4.87 |
| | 5.52 | 16633.7 | 4.22 |
| | 6.00 | 3682.6 | 3.57 |

EXAMPLES 6–12

These examples illustrate how the covering power of coatings of the microdispersions of the invention can vary with composition using coatings of microprecipitated dispersions of Dye 1.

Preparation of Dye 1 Stock Solution

A stock solution of Dye 1 was prepared by making an aqueous slurry of about 29.7 g of fully protonated Dye 1 prepared as described in Example 1 in about 235 ml of distilled water and adding 4N aqueous NaOH to dissolve the dye. The initial slurry pH was 6.5. The dissolution and aqueous NaOH addition were carried out at pH 9 under pH-stat conditions using a Radiometer Copenhagen TTT80 Titrator, REC80 Servograph, ABU80 Autoburette, and PHM63 Digital pH Meter. The proportional band control was set to 0.2 and the autoburette delivery speed was set at 2 ml/min. The dissolution process was allowed to proceed for about 70 minutes. The resulting solution was then evaluated for dye concentration by examining dilutions of aliquots by visible spectrophotometry ($\epsilon \approx 116,500$ at 615 nm). The concentration of this stock solution was 0.088M.

Preparation of Gelatin/Surfactant Stock Solution

Gelatin/surfactant stock solutions were prepared as stabilizer solutions for the dispersion of these examples. Solutions were prepared at about 60° C. and comprised about 64.5 g of 12.5% aqueous gelatin, about 3.5 g of 10% dispersing aid DA-8 and about 282 g water.

Preparation of Dispersions

The dispersions were prepared in an 80 ml jacketed reactor thermostated at 60° C. with a circulating water bath. Stirring was done using a shrouded turbine, approximately 1 inch in diameter (four canted turbine blades surrounding a 0.25" diameter shaft and surrounded by a tubular ring about 0.25" in height) at about 1500 rpm.

The dispersions were formulated by adding about 50 ml of the gelatin/surfactant stock solution to the reactor followed by about 10 ml of the dye stock solution. Using the equipment described above, the dispersion was precipitated by adding 0.2N sulfuric acid while stirring at a rate of about 1.2 ml/min until the pH and amount of acidification indicated in Table III were reached.

Some of the acid added was consumed by the gelatin stabilizer present in the dispersion; the rest of the acid was consumed by the precipitated dye dispersion. To determine the amount of acid consumed by the gelatin, the amount of acid solution required to lower the pH of 50 ml of the gelating/surfactant stock solution to the desired pH was first determined. The final pH, amounts of acid added, amounts of acid consumed by the gelatin, and amounts of acid consumed by the dye for Examples 6–12 are shown in Table III. After a given amount of acid was added to a particular dispersion, the precipitated dispersion was allowed to equilibrate for about 10 minutes with stirring and the final pH was recorded. The dispersions were then sonicated for about 2 minutes at setting #7 using a Heat Systems-Ultrasonics, Inc. W-385 Ultrasonic Processor and a ½" diameter ultrasonic probe. The dispersions were then chill set and stored in a refrigerator until used for coating and evaluation.

Coating and Evaluation of Dispersions

Single layer coatings on film support were prepared for testing. Coating melts were formulated by mixing about 3.2 g of dispersion, about 3.42 g of 12.5% aqueous gelatin, about 0.3 g of 10% dispersing aid DA-5, and about 13 g water. The pH was then adjusted to the final pH listed in Table III. The resulting melts were coated at about 40° C., chill set, and air dried. The film support was a 7 mil thick polyethylene terephthalate film. The melts were coated as is, after being sonicated for 15 seconds at setting #7 using the apparatus described above, using a 0.004" coating knife as known in the art.

The resulting coatings were then evaluated for covering power (CP) as defined in Example 1. The wavelength used for CP evaluation is the wavelength of maximum absorbance which was greater than 680 nm in all cases illustrated in Table III. CP data in column 6 were obtained for coatings of melts that were not sonicated (CP1). CP data in column 7 were obtained for coatings of melts that were sonicated (CP2).

The data listed in column 5 of Table III illustrate the equivalent of protons consumed by the dye in the dispersion divided by the corresponding number of ionizable acid sites available from the dye in the dispersion. The data show that for the composition range illustrated for microprecipitated dye dispersions of the invention, relatively high CP values are obtained at wavelengths greater than 680 nm.

Absorption spectra for coatings of the sonicated melts of these examples are shown in FIG. 5. The various curves are identified by their Table III example number. The spectra show that all of the compositions of the invention yield the sharp long wavelength absorption peak, above 680 nm, characteristic of Dye 1 dispersions of the invention. The spectra illustrate how the relative absorbance in the 400 to 650 nm region grows as the ratio of protons consumed by the dye and the equivalents of ionizable acid salts from the incorporated dye approaches unity.

TABLE III

| Example No. | 1 pH | 2 mmol H+ Added | 3 mmol H+ Consumed by Gelatin | 4 mmol H+ Consumed by Dye | 5 eq. H+ / eq. Dye | 6 CP1 | 7 CP2 |
|---|---|---|---|---|---|---|---|
| 6 | 5.97 | 0.80 | 0 | 0.80 | 0.33 | 0.016 | 0.017 |
| 7 | 5.91 | 1.40 | 0 | 1.40 | 0.57 | 0.018 | 0.020 |
| 8 | 5.74 | 1.80 | 0.007 | 1.79 | 0.72 | 0.019 | 0.020 |
| 9 | 5.22 | 2.20 | 0.11 | 2.09 | 0.85 | 0.014 | 0.018 |
| 10 | 4.69 | 2.40 | 0.26 | 2.14 | 0.87 | 0.007 | 0.013 |
| 11 | 4.61 | 2.60 | 0.28 | 2.32 | 0.88 | 0.006 | 0.009 |
| 12 | 3.99 | 3.06 | 0.55 | 2.51 | 0.95 | 0.005 | 0.007 |

Although the invention has been described in considerable detail in the foregoing, it is to be understood that such detail is solely for the purpose of illustration and that variations may be made without departing from the spirit and scope of the invention except as set forth in the claims.

What is claimed is:

1. A microprecipitated dispersion comprising a methine oxonol filter dye having the formula:

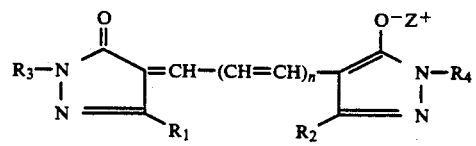

wherein n is 0, 1, or 2; $R_1$, $R_2$, $R_3$, and $R_4$ are the same or different substituted or unsubstituted alkyl or aryl groups, one or more of $R_1$, $R_2$, $R_3$, and $R_4$ contains carboxy substituent—$CO_2^-Z^+$, wherein $Z^+$ is a statistical mixture of hydrogen ($H^+$) and alkali or tetraalkylammonium cations ($M^+$) such that $Z^+ = xH^+ + (1-x)M^+$, where x is a decimal ranging from about 0.33 to about 0.95.

2. The dispersion of claim 1 wherein $R_1$, $R_2$, $R_3$, and $R_4$ are the same or different lower alkyl group having 11. The dispersion of claim 1 wherein the methine oxonol filter dye has the formula:

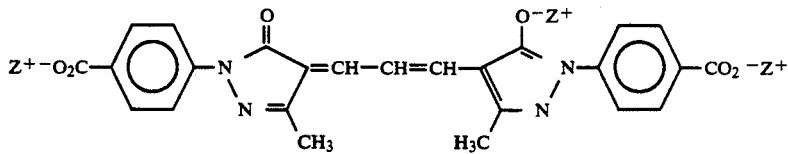

from 1 to 8 carbon atoms.

3. The dispersion of claim 2 wherein $R_1$, $R_2$, $R_3$, and $R_4$ are the same or different lower alkyl group having from 1 to 3 carbon atoms.

4. The dispersion of claim 1 wherein at least one R is a p-carboxyphenyl group.

wherein $Z^+$ is a statistical mixture of hydrogen ($H^+$) and alkali or tetraalkylammonium cations ($M^+$) such that $Z^+ = xH^+ + (1-x)M^+$, where x is a decimal ranging from about 0.33 to about 0.95.

12. The dispersion of claim 1 wherein the methine oxonol filter dye has the formula:

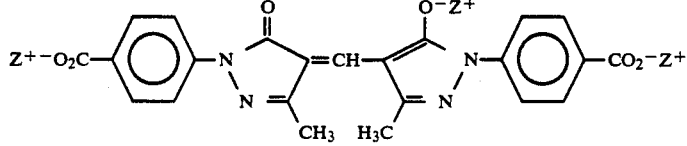

5. The dispersion of claim 1 wherein the alkali cations are lithium, sodium, potassium, cesium, rubidium, or a mixture thereof.

6. The dispersion of claim 5 wherein the alkali cations are sodium or potassium.

7. The dispersion of claim 1 wherein the tetraalkylammonium cation is tetramethylammonium.

wherein $Z^+$ is a statistical mixture of hydrogen ($H^+$) and alkali or tetraalkylammonium cations ($M^+$) such that $Z^+ = xH^+ + (1-x)M^+$, where x is a decimal ranging from about 0.33 to about 0.95.

13. The dispersion of claim 1 wherein the methine oxonol filter dye has the formula:

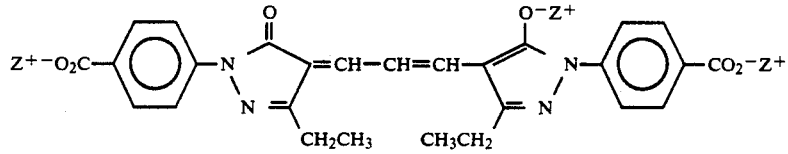

8. The dispersion of claim 1 wherein x ranges from about 0.55 to about 0.85.

9. The dispersion of claim 1 wherein the filter dye has a solubility in water that exceeds about 0.1% at a pH of 10.

10. The dispersion of claim 1 wherein the methine oxional dye has the formula:

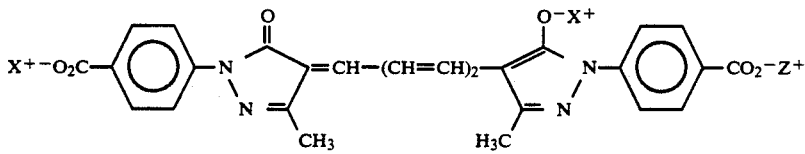

wherein $Z^+$ is a statistical mixture of hydrogen ($H^+$) and alkali or tetraalkylammonium cations ($M^+$) such that $Z^+ = xH^+ + (1-x)M^+$, where x is a decimal ranging from about 0.33 to about 0.95.

14. The dispersion of claim 1 wherein the dispersed particles have a mean diameter ranging from about 3 to about 1000 nm.

15. The dispersion of claim 8 wherein the dispersed particles have a mean diameter ranging from about 5 to about 100 nm.

wherein $Z^+$ is a statistical mixture of hydrogen ($H^+$) and alkali or tetraalkylammonium cations ($M^+$) such that $Z^+ = xH^+ + (1-x)M^+$, where x is a decimal ranging from about 0.33 to about 0.95.

16. The dispersion of claim 1 wherein $R_1$ and $R_2$ are each independently methyl or ethyl and $R_3$ and $R_4$ are both 4-carboxyphenyl.

* * * * *